(12) United States Patent
Lai et al.

(10) Patent No.: US 8,351,701 B2
(45) Date of Patent: Jan. 8, 2013

(54) METHOD FOR RECOGNIZING DICE DOTS

(75) Inventors: Ying-Nan Lai, Taichiu (TW);
Shun-Tsung Hsu, Taichiu (TW);
Chang-Yi Wang, Taichiu (TW);
Ming-Tien Tsai, Taichiu (TW)

(73) Assignee: Tien-Shu Hsu, Taichiu (TW)

( * ) Notice: Subject to any disclaimer, the term of this patent is extended or adjusted under 35 U.S.C. 154(b) by 900 days.

(21) Appl. No.: 12/106,370

(22) Filed: Apr. 21, 2008

(65) Prior Publication Data
US 2009/0263008 A1 Oct. 22, 2009

(51) Int. Cl.
*G06K 9/18* (2006.01)
(52) U.S. Cl. .......................... 382/182; 273/146; 370/394
(58) Field of Classification Search .................. 382/182; 345/20, 63, 581–618, 690–697; 273/145
See application file for complete search history.

(56) References Cited

U.S. PATENT DOCUMENTS

| | | | | |
|---|---|---|---|---|
| 4,342,906 A | * | 8/1982 | Hyatt | 250/205 |
| 4,823,394 A | * | 4/1989 | Berkin et al. | 382/145 |
| 5,031,913 A | * | 7/1991 | Hirosumi et al. | 273/145 C |
| 5,707,061 A | * | 1/1998 | Ikeda et al. | 273/145 R |
| 7,360,762 B2 | * | 4/2008 | Itagaki et al. | 273/146 |
| 7,537,347 B2 | * | 5/2009 | Dewald | 353/38 |
| 7,539,583 B2 | * | 5/2009 | Fu et al. | 702/81 |
| 7,705,868 B2 | * | 4/2010 | Masuda et al. | 347/238 |
| 2003/0078089 A1 | * | 4/2003 | Gray et al. | 463/16 |
| 2004/0208359 A1 | * | 10/2004 | Pishva | 382/162 |
| 2006/0065858 A1 | * | 3/2006 | Spears et al. | 250/559.29 |
| 2006/0199287 A1 | * | 9/2006 | Fu et al. | 438/16 |

* cited by examiner

*Primary Examiner* — Vu Le
*Assistant Examiner* — Aklilu Woldemariam
(74) *Attorney, Agent, or Firm* — Muncy, Geissler, Olds & Lowe, PLLC

(57) ABSTRACT

A method recognizing dice dots comprises the steps: projecting at least one dice with a plurality of different angle light sources; capturing a plurality of images of the dice according to the projecting times of the light sources on the dice; and recognizing dice dots based on the images through calculation methods. When recognized results obtained through the calculation methods are judged same by the recognizing module the dice dots are confirmed and accepted. If the recognized results done through the calculation methods are different, the dice is rolled anew.

2 Claims, 6 Drawing Sheets

METHOD FOR RECOGNIZING DICE DOTS

FIELD OF THE INVENTION

The present invention relates to a method to recognize dice dots and particularly to a method to recognize dice dots through a plurality of recognition and calculation methods.

BACKGROUND OF THE INVENTION

These days people increasingly treasure leisure activities. As a result recreational businesses are flourishing. Among them gambling is very popular. Throwing or rolling dice is one of the widely loved games. It is almost ubiquitous, and can be seen in houses, outdoors and business environments. One of the common rules of the game of rolling dice is: players place bets first and guess the total dots; the dealer rolls the dice and counts the total dots when moving of the dice stops to determine win and loss.

In the conventional game playing rolling of the dice is done manually. The rectitude or fairness of the dealer who rolls the dice often is suspected by the players. As the force or angle of throwing the dice could affect the dot number and outcome. Some even resort to cheating schemes such as crooked dice or loaded dice to take the advantages of the ignorance of the players. This spoils the pleasure of playing dice games.

To remedy the aforesaid problem, automatic dice rolling machines have been developed that have a recognition means to confirm dice dots. The recognition means usually performs recognition by detecting the dots through electric signals such as picture signals. However, such a method is easily compromised by control of people and produces fake results. This creates concerns of the players and affects their willingness and interests in playing the game. Hence the automatic dice rolling machine is not well accepted in legitimate recreational sites.

Moreover, even if the dealer does not tamper the dice and affect the fairness of the dice games, the automatic dice rolling machine is prone to recognition errors due to deficiency of recognition techniques, such as starting recognition process while the dice are still moving, impact of environmental factors such as light and angles of image capturing and the like.

Therefore how to provide an accurate method to recognize dice dots to improve the efficiency and fairness of dice rolling game is an issue remained to be resolved in the industry.

SUMMARY OF THE INVENTION

The primary object of the present invention is to provide a method for recognizing dice dots. The method includes the following steps: projecting at least one dice with a plurality of different angle light sources; capturing a plurality of images of the dice according to the projecting times of the light sources on the dice; and recognizing dice dots based on the images through a plurality of calculation methods.

By means of the method set forth above, if recognized results of the calculation methods are the same, the dice dots are confirmed and accepted. If the recognized results of the calculation methods are different, the dice is rolled again. The light sources are generated by a light source module. The images of the dice are captured by a capturing module. The calculations are stored in a recognizing module. The method set forth above may be built in an application program stored in a computer accessible recording medium.

The invention, by projecting multiple light sources to the dice to get images of varying angles and through multiple calculation methods, achieves recognition of the dice dots. The recognition result of dice dots of the automatic dice rolling machine equipped with the features of the invention is more accurate. Operation efficiency of dice rolling improves and fairness of the game is enhanced.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
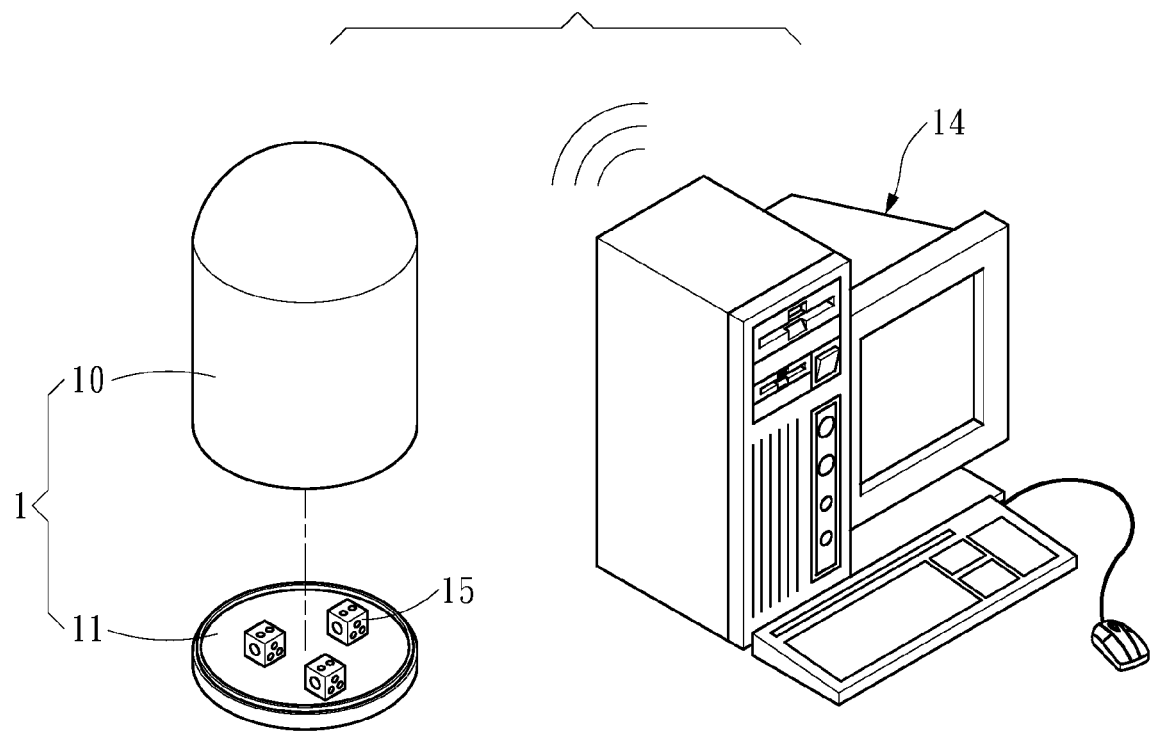
FIG. 1 is a schematic view of the structure of the invention
Figure 2:
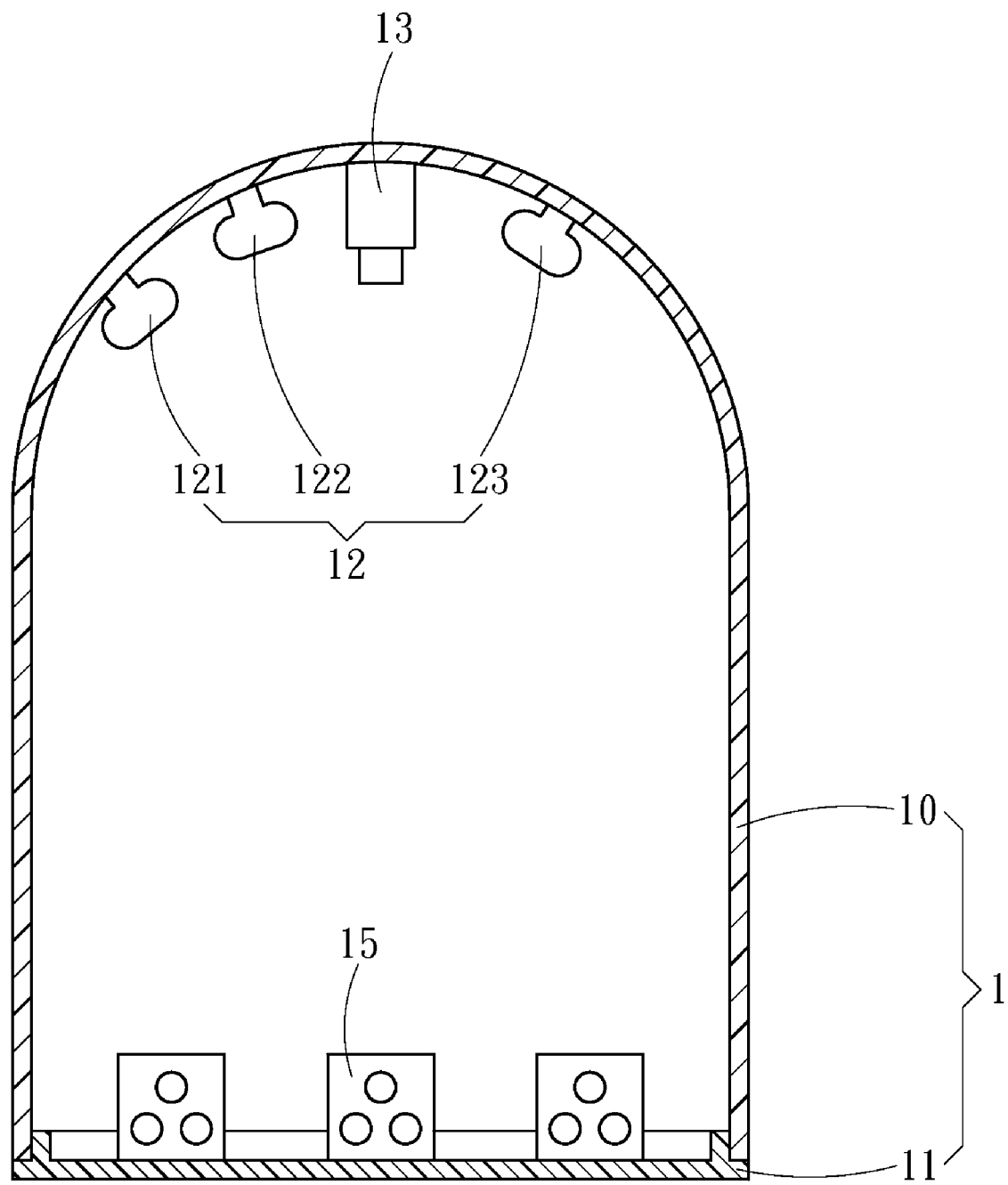
FIG. 2 is a sectional view of the dice cup of the invention.

Please refer to FIGS. 1 and 2 for an apparatus to recognize dice dots according to the invention. It includes a dice cup 1 for holding at least one dice 15, a light source module 12, a capturing module 13 and a recognizing module 14. The dice cup 1 has a base 11 to hold the dice 15 and a hood 10 made from an opaque material to be fastened to the base 11. The light source module 12 is located in the hood 10 to generate a plurality of light sources 121, 122 and 123 to project lights to the dice 15 at different angles. The capturing module 13 also is located in the hood 10 to capture images of the dice 15 at a number of times according to the light projecting times of the light sources 121, 122 and 123 onto the dice 15 to generate a plurality of corresponding images information S1, S2 and S3 (referring to FIGS. 3A, 3B and 3C). The recognizing module 14 receives the image information S1, S2 and S3 from the capturing module 13 through a wired or wireless transmission means and also stores a plurality of calculation methods to recognize dots on the dice 15 based on the image information S1, S2 and S3. In an embodiment of the invention, the capturing module 13 is a dynamic image capturing device such as a video camera consisting of CCDs or CMOS, or may include a static image capturing device such as a camera. The techniques and devices for capturing the images of the dice 15 are known in the art, thus details are omitted herein. Furthermore, the numbers of the dice 15 and light sources 121, 122 and 123 are not limited to those shown in the drawings, and can be increased or decreased as required when in use. The recognizing module 14 is a computer equipped with an image capturing adapter card to execute two or more calculation methods to recognize the dot on the dice 15 based on the captured image information S1, S2 and S3.

Figure 3A:
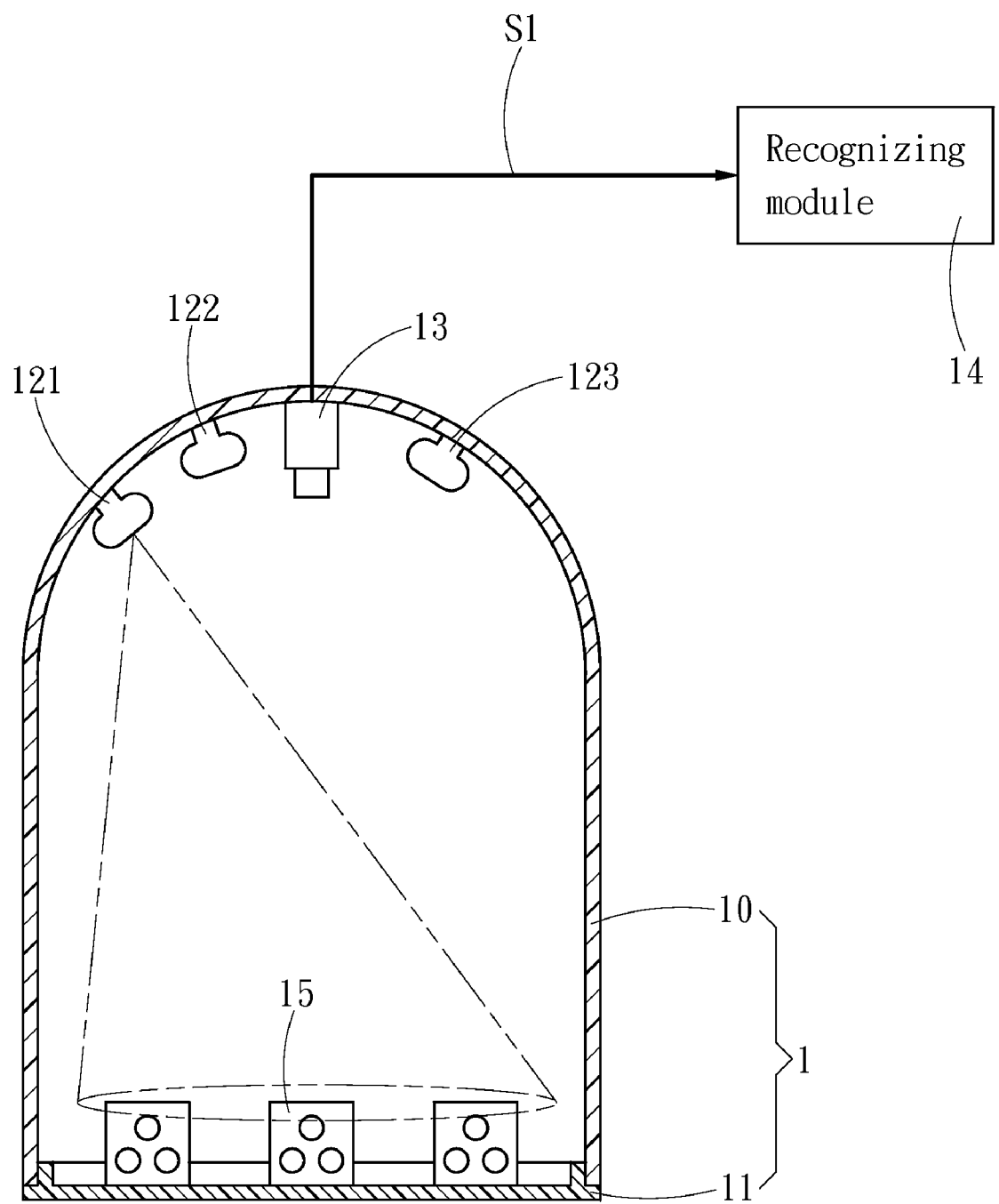
FIGS. 3A, 3B and 3C are schematic views of the invention in operating conditions.
Figure 3B:
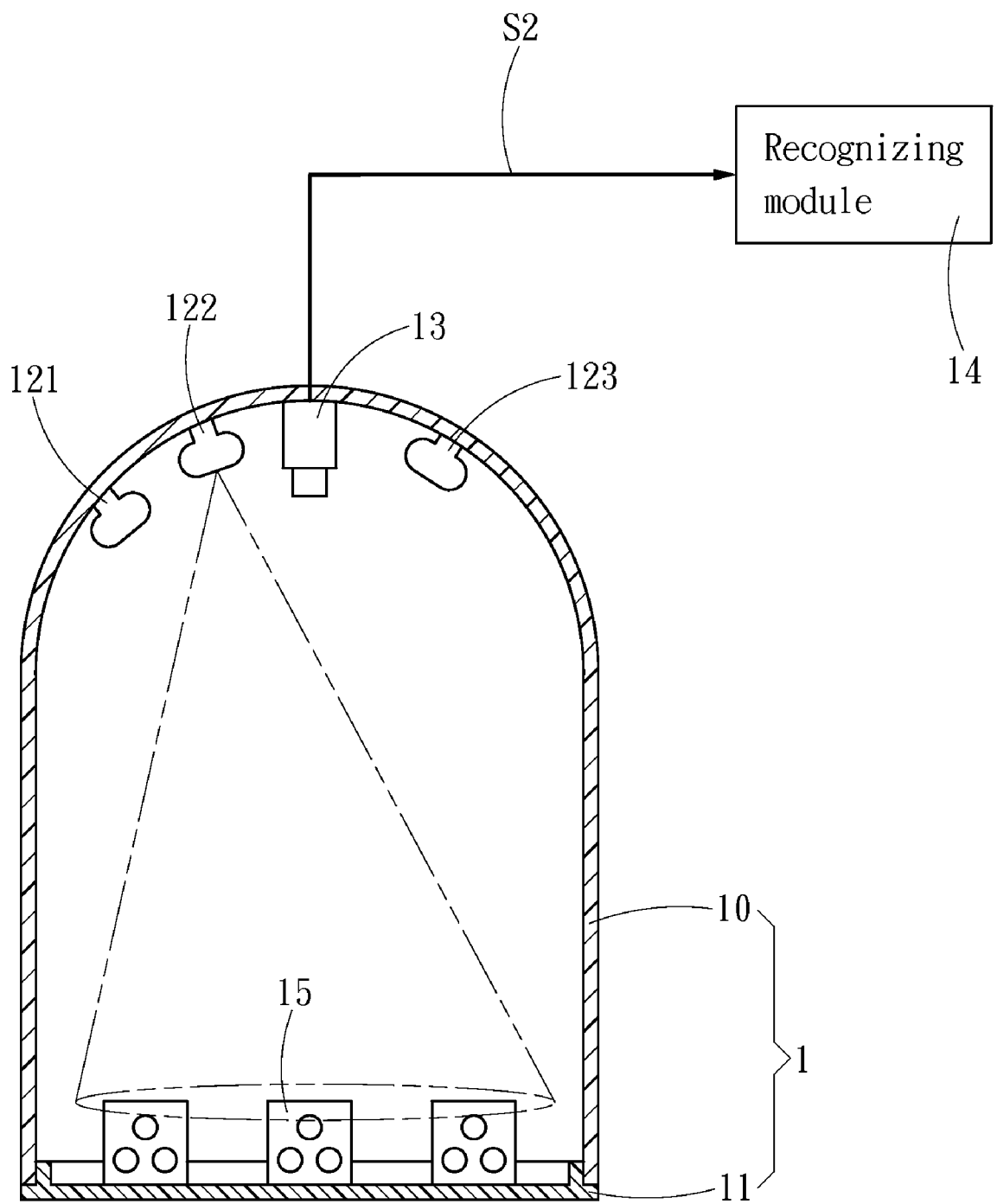
Figure 3C:
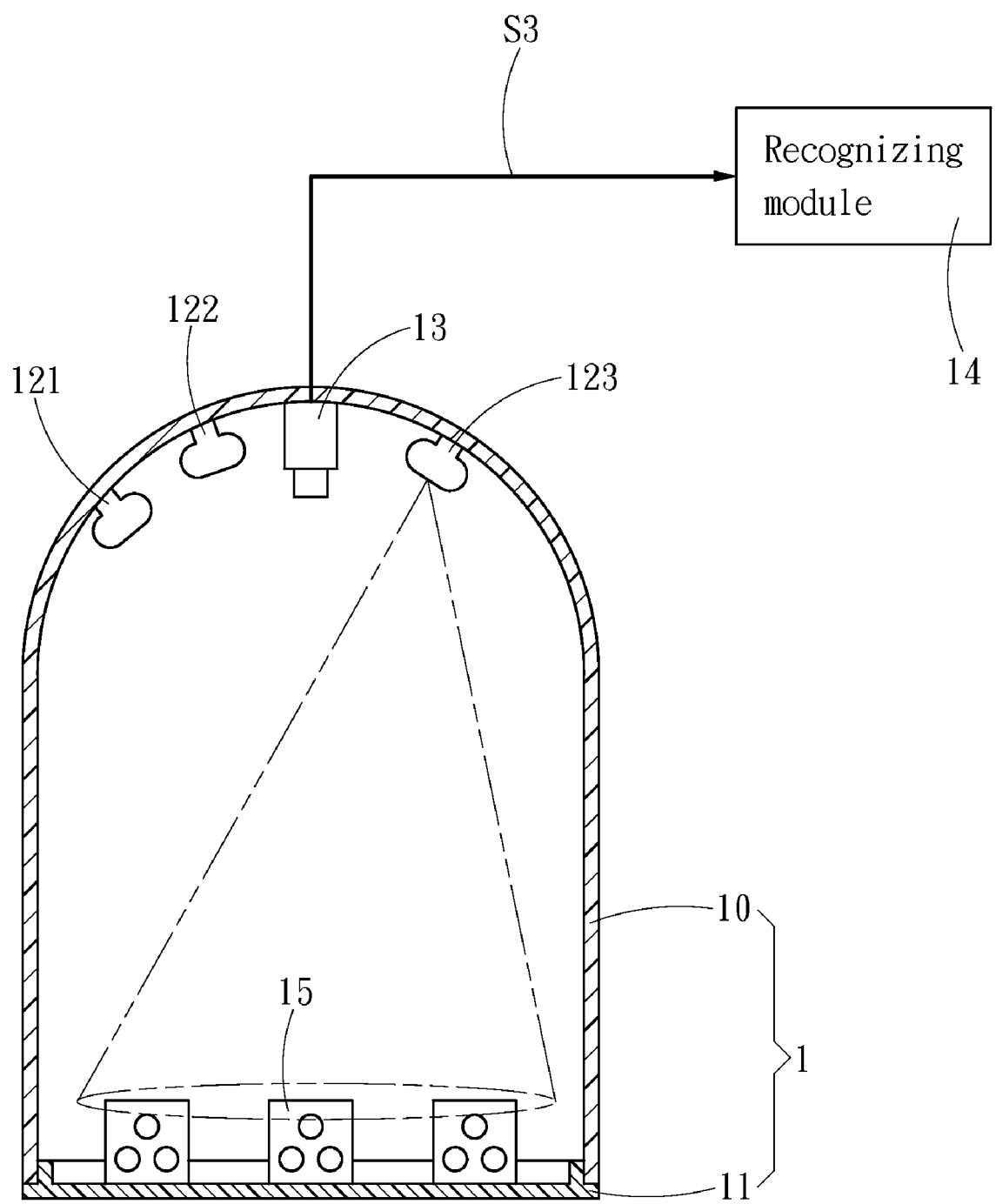
Figure 4:
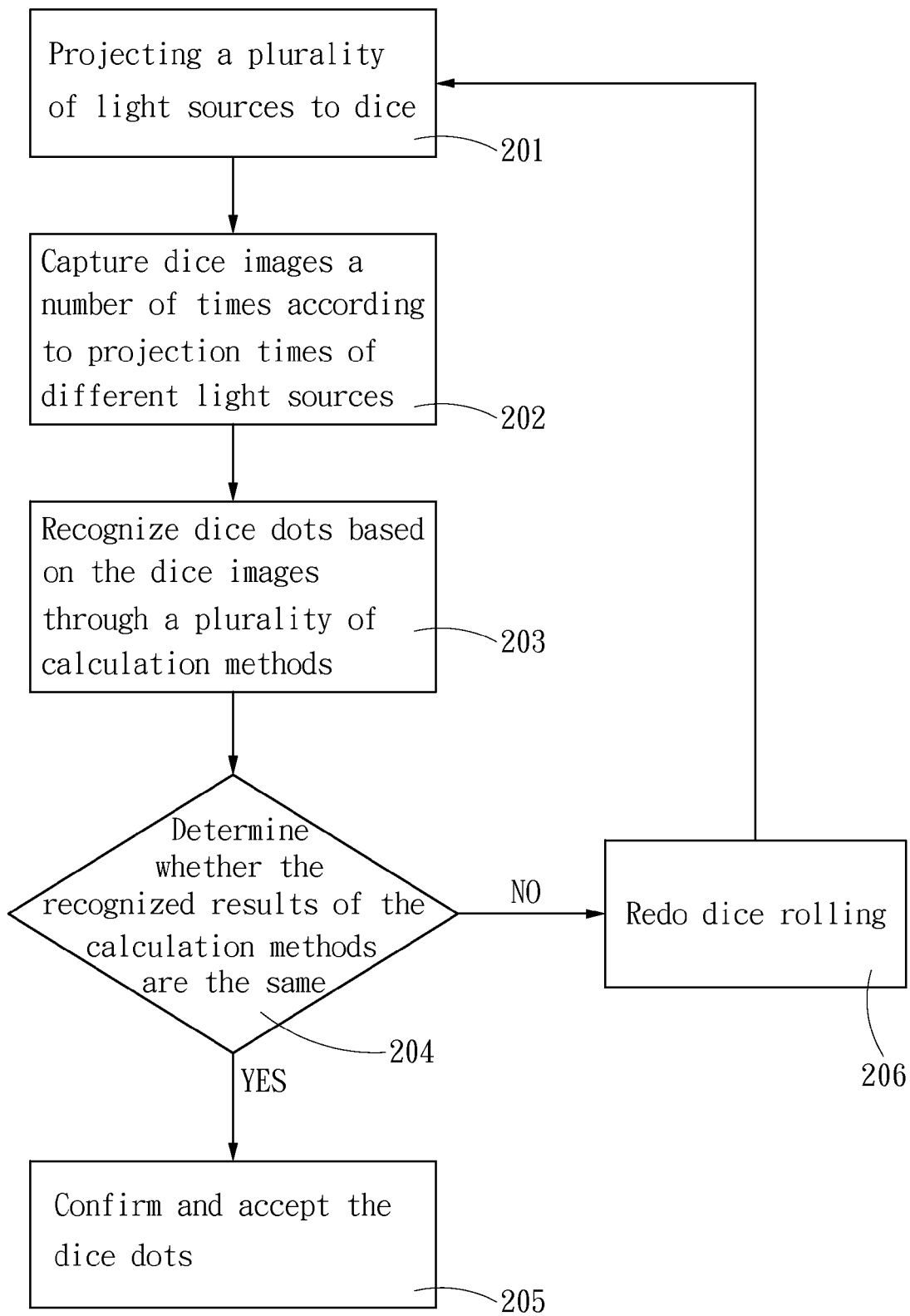
FIG. 4 is a flowchart of the invention.

Refer to FIGS. 3A through 4 for the process flow and method for recognizing the dot of the dice 15 according to the invention. After the dice 15 is rolled, the light sources 121, 122 and 123 project light to the dice 15 for three times (step 201), and the hood 10 prevents external light from interfering the projection of the light sources 121, 122 and 123. The capturing module 13 captures images of the dice 15 resulting from the projection of the light sources 121, 122 and 123 to generate the image information S1, S2 and S3 (step 202). More specifically, the light source 121 projects light to the dice 15 and the capturing module 13 captures the image of the dice 15 and transmit the image information S1 to the recognizing module 14. Next, the light source 122 projects light to the dice 15 and the capturing module 13 captures another image of the dice 15 and transmits the another image information S2 to the recognizing module 14. Finally, the light source 123 projects light to the dice 15 and the capturing module 13 captures yet another image of the dice 15 and transmit the yet another image information S3 to the recognizing module 14. The recognizing module 14 processes the received image information S1, S2 and S3 through the calculation methods to do recognition of the dice 15 (step 203). Then a recognition result is determined after processing of the calculation methods is finished (step 204).

In the event that the calculation results show that the dots of the dice 15 are the equal, the results indicate that the captured images of the capturing module 13 are correct, and the recognizing module 14 displays the dots of the dice 15 (step 205). If the calculation results show different dots of the dice 15, problems could occur to the captured images of the capturing module 13, the recognizing module 14 issues a command to redo rolling of the dice 15 (step 206), and the recognition process for the dots of the dice 15 is executed anew.

It is to be noted that the number and types of calculation methods stored in the recognizing module 14 are not limited to two as previously discussed. Image recognition of the dice 15 can be performed through varying numbers of calculation methods. This technique is known in the art and can be easily adapted to the process of the recognizing module 14, thus details are omitted.

The method for recognizing dice dots of the invention can be implemented through an application program to control various modules of the apparatus previously discussed. The application program may be stored in a computer accessible recording medium such as a ROM (read only memory), flash memory, floppy diskette, hard disk, optical disk, portable disk, magnetic tape, database accessible through networks, or other storage media of the same function.

As a conclusion, the invention provides a hood 10 made from opaque material to prevent the light source module 12 held in the hood 10 from being interfered by the external light. By providing different angle light sources 121, 122 and 123, the capturing module 13 can capture a plurality of images of the dice 15 to generate a plurality of image information S1, S2 and S3. Through multiple calculation methods provided by the recognizing module 14 the image information S1, S2 and S3 are compared and recognized, therefore accuracy of recognizing the dots of the dice 15 improves. In the event that the recognized results are different or the dots of the dice 15 cannot be determined, rolling of the dice 15 is redone to restart recognizing of the dots of the dice 15 to maintain fairness of the game.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A method for recognizing dice dots, comprising the steps of:
   providing a dice cup to hold at least one dice, wherein the dice cup includes a base to hold the dice and an opaque hood covering the base, and wherein the hood includes a plurality of light sources located therein to generate light and a capturing device located therein to capture a plurality of images of the dice;
   providing a recognizing device located outside the dice cup and electrically connected to the capturing device, wherein the recognizing device stores a plurality of image processing algorithms to compare and recognize the plurality of images of the dice to obtain dice dots;
   projecting the light generated by the light sources to the dice multiple times at a different angle wherein each time projecting the light to the dice at different angles is carried out by only one of the plurality of light sources;
   capturing the plurality of images of the dice through the capturing device, wherein the number of the plurality of images is identical to the number of projection of the light sources to the dice and also identical to the number of light sources, and then the capturing device transmitting the plurality of images to the recognizing device; and
   receiving the plurality of images captured by the capturing device through the recognizing device and comparing and recognizing the plurality of images of the dice at the different angles through the image processing algorithms stored in the recognizing device to obtain dice dots;
   confirming and displaying the dice dots when the results of the image processing algorithms are same; and
   rolling anew the dice when the results of the image processing algorithms are different.

2. The method of claim 1, wherein the steps are executed by an application program stored in a non-transitory computer readable storage medium.

\* \* \* \* \*